US010834900B2

(12) United States Patent
Smith

(10) Patent No.: US 10,834,900 B2
(45) Date of Patent: Nov. 17, 2020

(54) GRABBER BUCKET SCOOP AND SCRAPER WITH STICKY ROLL AND DIRECTIONAL LED

(71) Applicant: Vincent Smith, Miami, FL (US)

(72) Inventor: Vincent Smith, Miami, FL (US)

( * ) Notice: Subject to any disclaimer, the term of this patent is extended or adjusted under 35 U.S.C. 154(b) by 0 days.

(21) Appl. No.: 16/018,739

(22) Filed: Jun. 26, 2018

(65) Prior Publication Data

US 2019/0387713 A1    Dec. 26, 2019

(51) Int. Cl.
*A01K 29/00* (2006.01)
*E01H 1/12* (2006.01)
*A01K 23/00* (2006.01)
*B25J 1/04* (2006.01)

(52) U.S. Cl.
CPC ......... *A01K 23/005* (2013.01); *E01H 1/1206* (2013.01); *B25J 1/04* (2013.01); *E01H 2001/128* (2013.01)

(58) Field of Classification Search
CPC ............................ A01K 23/005; E01H 1/1206
USPC ............................................ 294/1.3, 1.4, 1.5
See application file for complete search history.

(56) References Cited

U.S. PATENT DOCUMENTS

| 3,733,098 | A  | * | 5/1973  | Tobias | B65D 5/10 |
| | | | | | 294/1.4 |
| 5,054,828 | A  | * | 10/1991 | Hantover | E01H 1/1206 |
| | | | | | 15/257.1 |
| 7,448,659 | B1 | * | 11/2008 | Auseklis | E01H 1/1206 |
| | | | | | 294/1.4 |
| 7,854,455 | B2 | * | 12/2010 | Ruscil | A01K 23/005 |
| | | | | | 294/1.5 |
| 7,992,753 | B2 | * | 8/2011  | Edwards | B65H 35/10 |
| | | | | | 119/174 |
| 9,091,031 | B2 | * | 7/2015  | Naseem | E01H 1/1206 |
| 9,217,231 | B2 | * | 12/2015 | Briski | E01H 1/1206 |
| 9,469,951 | B1 | * | 10/2016 | Qi | E01H 1/1206 |
| 9,578,850 | B2 | * | 2/2017  | Taylor | A01K 1/0114 |
| 9,920,494 | B2 | * | 3/2018  | Rivadeneira | E01H 1/0836 |
| 2013/0062896 | A1 | * | 3/2013 | Ahern | A01K 29/00 |
| | | | | | 294/1.4 |
| 2015/0021943 | A1 | * | 1/2015 | Montgomery | E01H 1/1206 |
| | | | | | 294/1.4 |
| 2015/0042112 | A1 | * | 2/2015 | Briski | E01H 1/1206 |
| | | | | | 294/1.4 |
| 2015/0204036 | A1 | * | 7/2015 | Johnson | E01H 1/1206 |
| | | | | | 294/1.3 |

* cited by examiner

*Primary Examiner* — Paul T Chin
(74) *Attorney, Agent, or Firm* — Lyman Moulton, Esq.

(57) ABSTRACT

A grabber scoop and scraper device with sticky roll and LED includes a bucket scoop that opens and shuts by squeezing a handle grip attached thereto via an extension rod. The bucket scoop includes two halves each configured with attaching ends and scraper ends. A sticky portion is disposed concentrically on the extension rod proximal the bucket scoop to temporarily attach at least one disposable bag(s) thereto. A disposable bag encloses some of the extension rod to the two bucket scoop and attaches to the sticky portion to form a closed container inside-out therewith around a grabbed material. A grabber and scoop contents disposing method includes forming the bucket scoop and using the sticky portion to temporarily attach at least one disposable bag thereto. A directional light emitting diode attached to the device shines in a direction of the sticky roll and the bucket scoop and may be automatically activated.

20 Claims, 4 Drawing Sheets

GRABBER BUCKET SCOOP AND SCRAPER WITH STICKY ROLL AND DIRECTIONAL LED

BACKGROUND

Scoops are used in a variety of ways to gather and store or discard items and materials. Scoops may therefore be designed and constructed in a variety of ways to suit a variety of needs and applications. For instance, hand operated sediment sampling scoops may be used in seabed and continental shelf research. Even automated and detachable caching scoops, such as those of the Mars Rover, are used in soils and sample acquisition of other planets. On the other hand, refuse collection devices including the common dustpan are also used to keep domestic and commercial establishments clean. Scientists and children alike may even use the proverbial glass jar for collecting insects, small animals and plant samples. Furthermore, conscientious pet owners may use scoop devices including simple plastic bags for collecting dog feces in public places to comply with city ordinances and on their own property to maintain sanitary grounds.

However, all of these devices fall short as a ubiquitous and universal device for collecting, gathering, storing and shipping and handling of live, sterile, hot and cold, research items and materials and even common refuse. For instance, though it works well as a storage container for displaying insects, coaxing a frog or a tarantula spider into a glass jar is not an effective way of collecting specimens. On the other hand, though a leather glove may be an easier way to gather and handle an item, it does not of course store items very effectively. More sophisticated devices such as the seabed sediment sampling scoops and the Mars Rover sample acquisition scoops are complex, heavy, expensive and constructed for specialized use and may not be available to the general public.

SUMMARY OF THE INVENTION

A grabber bucket scoop and scraper device with sticky roll and directional LED includes a bucket scoop that opens and shuts by squeezing a handle grip attached thereto via an extension rod. The bucket scoop includes two halves each configured with attaching ends, enclosing scraper edges and end portions. A sticky substance portion is disposed concentrically on the extension rod proximal the bucket scoop to temporarily attach at least one disposable bag(s) thereto. A disposable bag encloses some of the extension rod to the two bucket scoop and attaches to the sticky portion to form a closed container inside-out therewith around a grabbed material. A grabber and scoop contents disposing method includes forming the bucket scoop and using the sticky portion to temporarily attach at least one disposable bag thereto. A directional light emitting diode attached to the device shines in a direction of the sticky roll and the bucket scoop and may be automatically activated.

Figure 1:
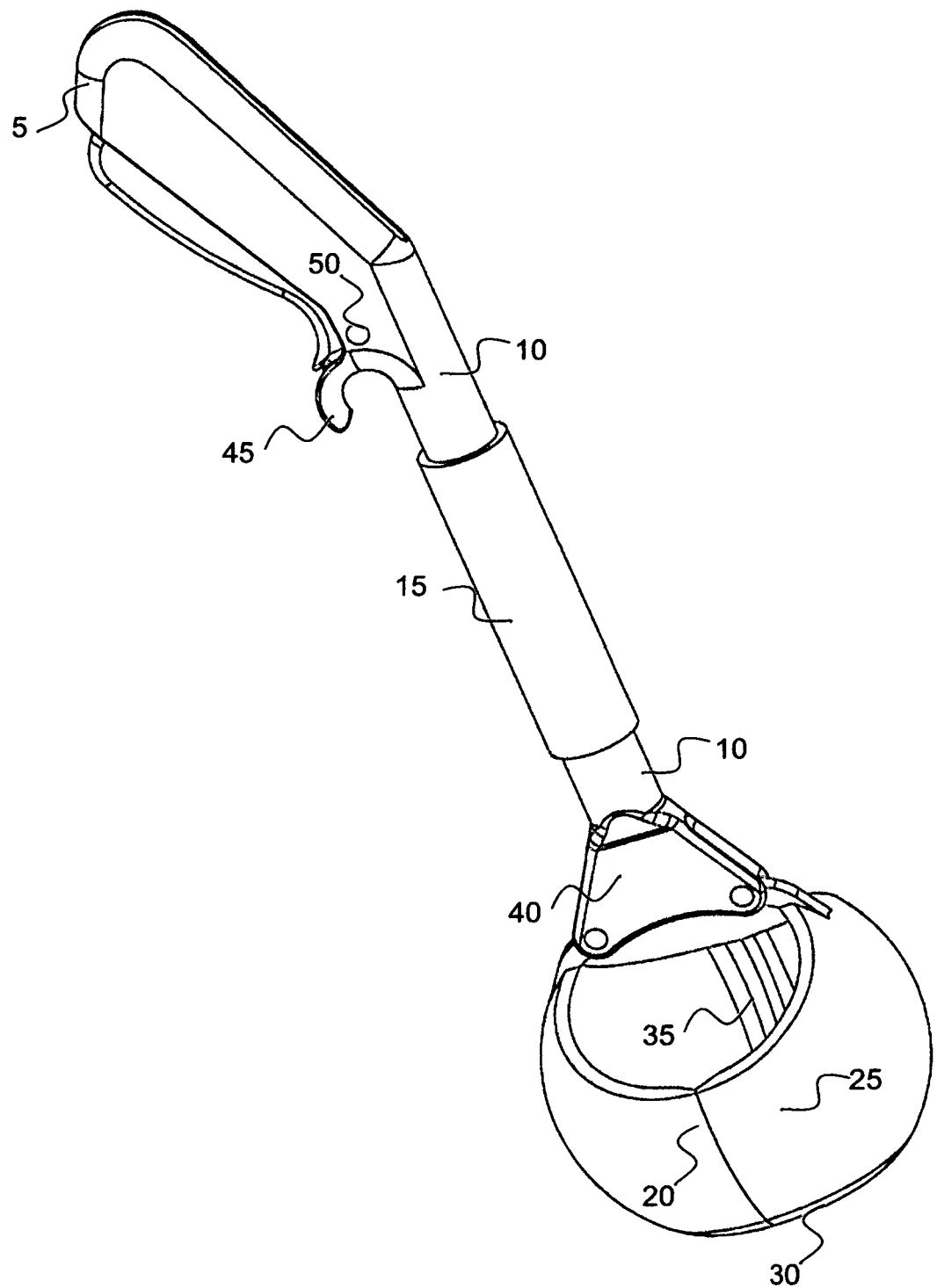
FIG. 1 is a top left perspective view of a closed grabber scoop and scraper with sticky roll and LED in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term 'grabber' is used in the common sense to refer to a telescopic device for extending one's grabbing reach mechanically for convenience and sanitary purposes. The term 'bag,' refers in the common sense to a flexible material container capable of being closed at a single opening referred to as a mouth.

FIG. 1 is a top left perspective view of a closed grabber scoop and scraper with sticky roll and LED in accordance with an embodiment of the present disclosure. A grabber device comprising the following limitations is disclosed. The grabber device includes a bucket scoop 20,25 configured to be open and shut by squeezing a handle grip 5 attached thereto via an extension rod 10, the bucket scoop comprising two halves 20,25 each configured with attaching ends, enclosing and scrapping edges 35, sticky substance strips 36 and end portions 30. The sticky substance strips 36 disposed on an inside of at least one of the bucket scoop halves to attract and secure an inside portion of the at least one disposable bag. The grabber device also includes a sticky portion 15 disposed concentrically on the extension rod 10 proximal the bucket scoop 20,25, the sticky portion 15 configured to temporarily attach at least one disposable bag (not shown) thereto. The grabber device additionally includes a hinge mechanism 40 configured to adjoin the two bucket scoop halves 20,25 at the attaching ends thereof to the extension rod 10 to form a closed rigid container therewith around a grabbed object and/or around grabbed materials (not shown).

Embodiments of the grabber device further include a directional LED (light emitting diode) 45 attached to the extension rod 10 or to the handle 5 configured to shine in a direction of the sticky roll 15 and the bucket scoop 20,25. The directional LED 45 automatically activates based on a squeezing motion on the handle 5.

An embodiment of the bucket scoop comprises one of a substantially spherical shape and a substantially clam shell shape with enclosing scrapper edges 35 and end portions 30 which are semi-flat. A sticky strip disposed on an inside of at least one of the bucket scoop halves (not shown), is configured to attract and secure a portion of the at least one disposable bag(s) to an inside of the bucket scoop halves 20 or 25.

Figure 2:
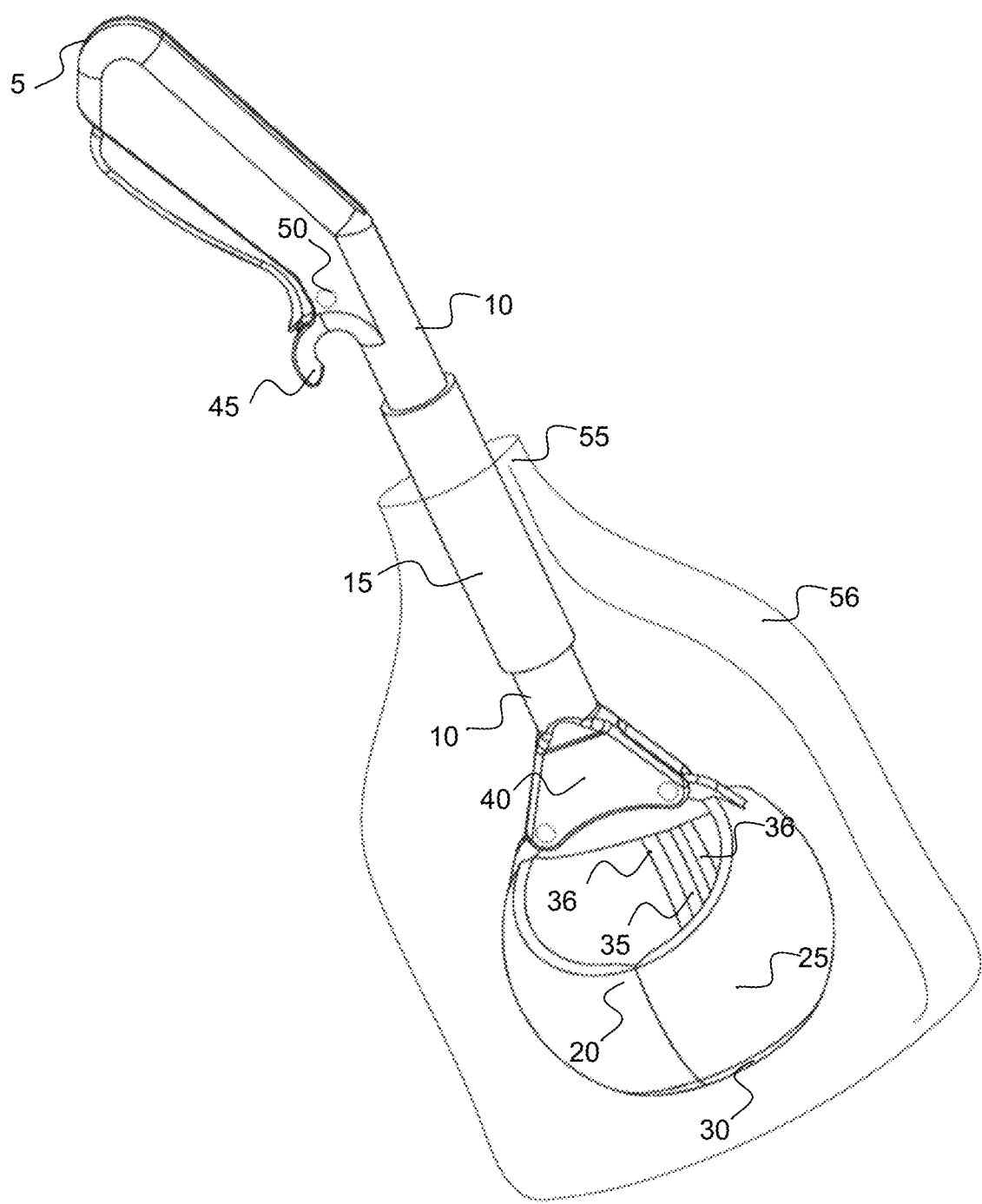
FIG. 2 is a top left perspective view of a closed grabber scoop and scraper with sticky roll and LED covered by a disposable bag in accordance with an embodiment of the present disclosure.

FIG. 2 is a top left perspective view of a closed grabber scoop and scraper with sticky roll and LED covered by a disposable bag in accordance with an embodiment of the present disclosure. An open end 55 of the at least one disposable bag(s) is sealed around the sticky portion 15 and the bag encloses the bucket scoop 20,25 in an embodiment. The sticky portion 15 comprises a concentric sticky ring, a concentric sticky roll and a sticky strip options depending on design factors such as a length of the extension rod 10 and a weight of the disposable bags, etc. Other similar limitations share the same reference numbers as referred to in other figures.

The enclosing scrapper edges 35 comprise a first end and a second complementary end forming a tongue and groove configuration. Embodiments of the enclosing scrapper edges 35 comprise a first beveled end and a second complementary beveled end configured to form a tight seal.

A lock 50 on the handle is designed to lock the two bucket scoop halves in a closed position to form a closed rigid container therewith around a grabbed object and/or around grabbed materials including animal feces.

Figure 3:
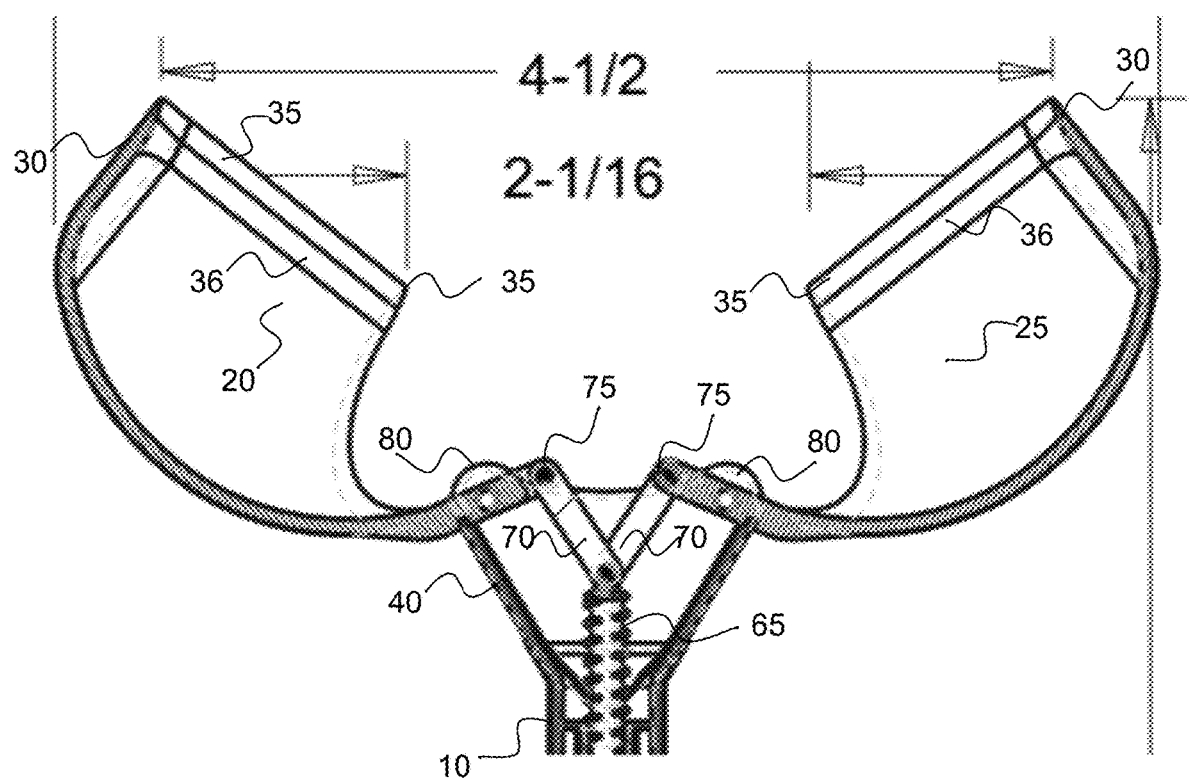
FIG. 3 is a close up detail view of an open grabber scoop and scraper with sticky roll and LED in accordance with an embodiment of the present disclosure.

FIG. 3 is a close up detail view of an open grabber scoop and scraper with sticky roll and LED in accordance with an embodiment of the present disclosure. Other similar limitations share the same reference numbers as referred to in other figures. A hinge mechanism comprises a shroud 40, a hinge boss 80 and a link hinge 75. A grip transfer mechanism proximal the hinge is designed to shut the bucket scoop halves 20,25 in response to a gripping force on the handle grip 5 transferred through the extension rod to the hinge mechanism. The grip transfer mechanism includes the hinge shroud 40, the geared rod 65 and the links 70. In an alternative embodiment, the hinge and grip transfer mechanical mechanisms proximal the hinge opens the bucket scoop halves 20,25 in response to a gripping force on the handle grip 5 transferred through the extension rod 10. The enclosure and scrapper edges and end portions are configured comb shaped, crenulated, and/or serrated to aid in grabbing and/or scraping an object and/or materials into the bucket scoop 20,25. At least some portion of the bucket scoops 20,25 is comprised of a low durometer material capable of allowing a user to perceive and grasp an object and/or materials in the bucket scoop and scraper by proxy tactile sense.

In an embodiment, the bucket scoop halves 20,25 are configured to detach from the extension rod and be disposed of inside one of the at least one disposable bag. The bucket scoop halves are comprised of a mesh and/or screen composition, a biodegradable composition and a fiberboard and/or paper composition since the disposable bag lends mechanical and sanitary support to a mesh design. The disposable bag is configured to be pulled off the sticky portion and pulled off inside-out from the device and enclose a feces of an animal for disposal.

A disclosed grabber scoop system comprises a bucket scoop 20,25 configured to be open and shut by squeezing a handle grip 5 attached thereto via an extension rod, the bucket scoop comprising two halves 20,25 each configured with attaching ends and scraper edges and flat end portions. The grabber system also includes a sticky portion 15 disposed concentrically on the extension rod 10 proximal the bucket scoop, the sticky portion 15 configured to temporarily attach at least one disposable bag(s) thereto. The grabber system additionally includes at least one disposable bag 56 configured to enclose a portion of the extension rod 10 to the two bucket scoop halves 20,25 and attach to the sticky portion 15 to form a closed container inside-out therewith around a grabbed material.

Figure 4:
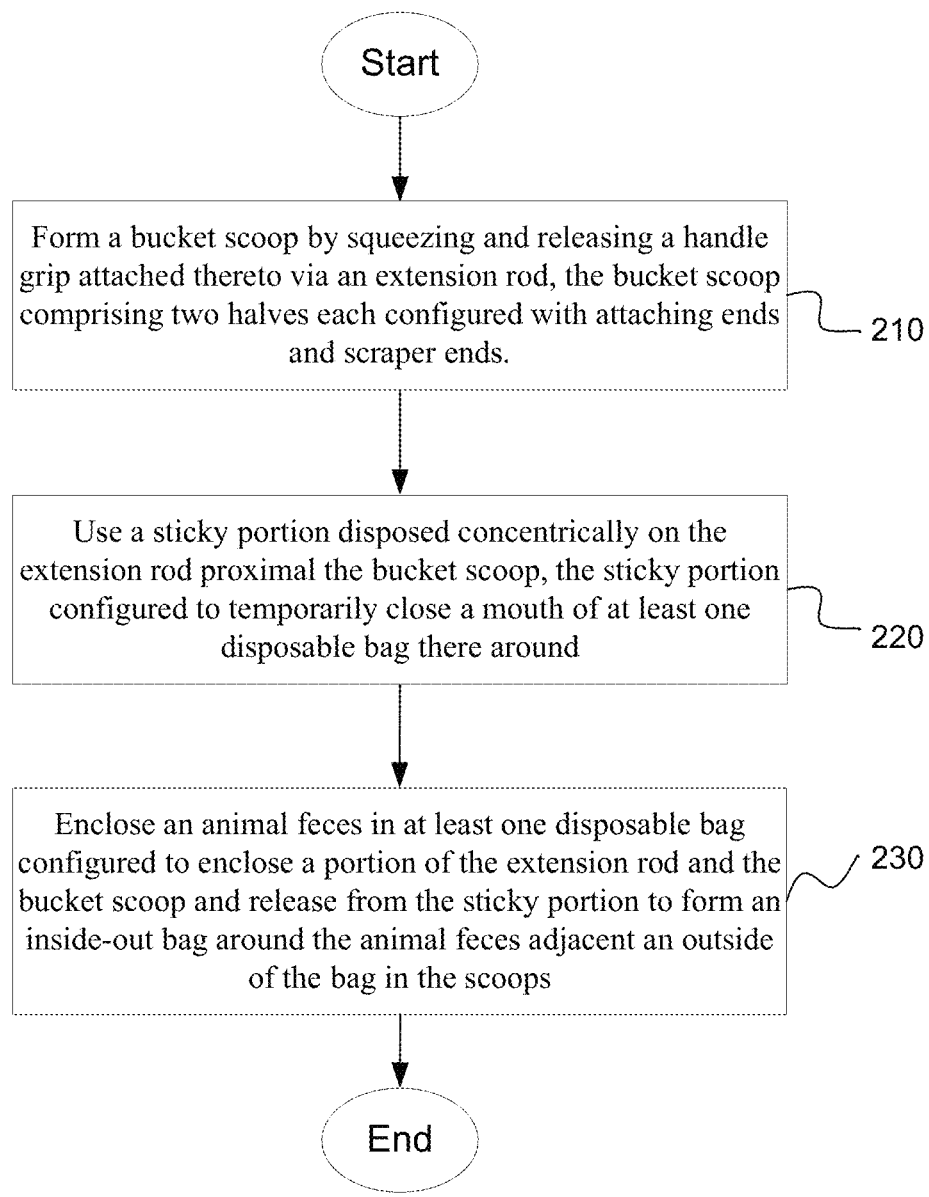
FIG. 4 is a flow chart of a grabber and scoop contents disposing method in accordance with an embodiment of the present disclosure.

FIG. 4 is a flow chart of a grabber and scoop contents disposing method in accordance with an embodiment of the present disclosure. A disclosed grabber method includes 210 forming a bucket scoop by squeezing and releasing a handle grip attached thereto via an extension rod, the bucket scoop comprising two halves each configured with attaching ends and scraper ends. The grabber method also includes 220 using a sticky portion disposed concentrically on the extension rod proximal the bucket scoop, the sticky portion configured to temporarily attach at least one disposable bag(s) thereto. The grabber method further includes 230 enclosing an animal feces in at least one disposable bag configured to enclose a portion of the extension rod and the bucket scoop and release from the sticky portion to form an inside-out bag around the animal feces. In other words, the disclosure claims a system and method for bagging an animal feces adjacent an outside of the bag which is secured to an inside of the scoops by sticky strips and pulled off a sticky roll inside-out there around.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:
1. A grabber device, comprising:
   a bucket scoop configured to be open and shut by squeezing a handle grip attached thereto via an extension rod, the bucket scoop comprising two halves each configured with attaching ends, enclosing scraper edges and end portions;
   a sticky substance roll disposed concentrically on the extension rod proximal the bucket scoop, the sticky substance roll configured to temporarily attach and seal a mouth of at least one disposable bag there around; and
   a hinge transfer mechanism configured to adjoin the two bucket scoop halves at the attaching ends thereof to the extension rod to form a closed rigid container therewith around a grabbed object adjacent an outside of the bag inside the scoops.

2. The grabber device of claim 1, further comprising a grip transfer mechanism proximal the hinge transfer mechanism for converting a gripping force at the handle across the extension rod into a grabber enclosure force at the bucket scoop via a geared rod and hinge linkage.

3. The grabber device of claim 1, further comprising a directional LED (light emitting diode) attached to the extension rod configured to shine in a direction of the sticky roll and the bucket scoop, the LED configured to automatically activate based on a squeezing motion on the handle.

4. The grabber device of claim 1, wherein the bucket scoop comprises one of a substantially spherical shape and a substantially clam shell shape comprising the enclosing scrapper edges which have a semi-flat end portion.

5. The grabber device of claim 1, further comprising a sticky substance strip disposed on an inside of at least one of the bucket scoop halves, the sticky substance strip configured to attract and secure an inside portion of the at least one disposable bag.

6. The grabber device of claim 1, wherein an open end of the at least one disposable bag(s) is sealed around the sticky substance roll and an inside of the bag fully encloses the bucket scoop.

7. The grabber device of claim 1, wherein the sticky substance roll comprises a concentric sticky ring.

8. The grabber device of claim 1, wherein the sticky substance roll comprises a concentric sticky roll.

9. The grabber device of claim 1, wherein the sticky substance roll comprises a sticky strip.

10. The grabber device of claim 1, wherein the scrapper ends comprise a first end and a second complementary end forming a tongue and groove configuration.

11. The grabber device of claim 1, wherein the scrapper ends comprise a first beveled end and a second complementary beveled end configured to form a tight seal.

12. The grabber device of claim 1, further comprising a lock on the handle configured to lock the two bucket scoop halves in a closed position to form a closed bagged poriton from the inside-out around grabbed materials.

13. The grabber device of claim 1, further comprising a mechanical mechanism proximal the hinge configured to shut and open the bucket scoop halves in response to a gripping force and release on the handle grip transferred through the extension rod to the mechanical mechanism.

14. The grabber device of claim 1, wherein the scrapper ends are configured comb shaped, crenulated, or serrated to aid in grabbing and/or scraping an object or materials into the bucket scoop.

15. The grabber device of claim 1, wherein at least some portion of the bucket scoops is comprised of a low durometer material capable of allowing a user to perceive and grasp an object or materials in the bucket scoop and scraper by proxy tactile sense.

16. The grabber device of claim 1, wherein the bucket scoop halves are configured to detach from the extension rod and be disposed inside one of the at least one disposable bag.

17. The grabber device of claim 1, wherein the bucket scoop halves are comprised of a mesh composition, a biodegradable composition and a fiberboard or paper composition.

18. The grabber device of claim 1, wherein the at least one disposable bag is configured to be pulled off the sticky substance roll inside-out therefrom and enclose a feces of an animal on an outside of the bag inside the scoops.

19. A grabber system, comprising:
a bucket scoop configured to be open and shut by squeezing a handle grip attached thereto via an extension rod, the bucket scoop comprising two halves each configured with attaching ends and scraper ends;
a sticky portion disposed concentrically on the extension rod proximal the bucket scoop, the sticky portion configured to temporarily close a mouth of at least one disposable bag there around; and
at least one disposable bag configured to enclose a portion of the extension rod to the two bucket scoop halves and attach to the sticky portion to form a closed container inside-out therewith around a grabbed material.

20. A grabber method, comprising:
forming a bucket scoop by squeezing and releasing a handle grip attached thereto via an extension rod, the bucket scoop comprising two halves each configured with attaching ends and scraper ends;
using a sticky portion disposed concentrically on the extension rod proximal the bucket scoop, the sticky portion configured to temporarily close a mouth of at least one disposable bag there around; and
enclosing an animal feces in at least one disposable bag configured to enclose a portion of the extension rod and the bucket scoop and release from the sticky portion to form an inside-out bag around the animal feces adjacent an outside of the bag inside the scoops.

* * * * *